(12) United States Patent
Salonen

(10) Patent No.: US 7,912,190 B2
(45) Date of Patent: Mar. 22, 2011

(54) METHOD AND SYSTEM FOR THE MASS SENDING OF MESSAGES

(75) Inventor: Jukka Salonen, Nurmijärvi (FI)

(73) Assignee: Bookit Oy Ajanvarauspalvelu, Helsinki (FI)

( * ) Notice: Subject to any disclaimer, the term of this patent is extended or adjusted under 35 U.S.C. 154(b) by 433 days.

(21) Appl. No.: 11/885,748

(22) PCT Filed: Nov. 27, 2006

(86) PCT No.: PCT/FI2006/050517
§ 371 (c)(1),
(2), (4) Date: Jun. 11, 2008

(87) PCT Pub. No.: WO2007/063179
PCT Pub. Date: Jun. 7, 2007

(65) Prior Publication Data
US 2008/0317224 A1    Dec. 25, 2008

(30) Foreign Application Priority Data

Dec. 2, 2005   (FI) ..................................... 20051245

(51) Int. Cl.
*H04M 11/00* (2006.01)
(52) U.S. Cl. ..................................... 379/93.01; 455/466
(58) Field of Classification Search ............... 379/93.01, 379/93.24; 455/466
See application file for complete search history.

(56) References Cited

U.S. PATENT DOCUMENTS
2004/0128158 A1   7/2004   Salonen

FOREIGN PATENT DOCUMENTS

| EP | 0 967 754 A2 | 12/1999 |
|---|---|---|
| EP | 1 065 899 A1 | 1/2001 |
| EP | 1 458 201 A1 | 9/2004 |
| FI | 20011680 | 2/2003 |
| WO | WO 02/067602 A1 | 8/2002 |
| WO | WO-2004/019223 A1 | 3/2004 |

OTHER PUBLICATIONS

Kauppalehti, "Mobiilipalvelujen oltava yksinkertaisia: BookIT:n Jukka Sa-lonen uskoo tavallisiin tekstiviesteihin", Heikki Nenonen, p. 19, published Sep. 6, 2005.
Elisa Plc's press release Nov. 22, 2004, "Innovative solution receives 2004 European Good Practice Award in occupational health and safety" and the appendix: "BookIT case.pdf", www.elisa.fi.
Elisa Plc's press release Sep. 6, 2004, "Bookit Ltd and Elisa implement a handy mobile phone-enabled check-in service for Finnair" www.elisa.fi.

(Continued)

*Primary Examiner* — Stella L Woo
(74) *Attorney, Agent, or Firm* — Birch, Stewart, Kolasch & Birch, LLP.

(57) ABSTRACT

The present publication discloses a method and system for sending messages in a telecommunications network (1, 2, 6, 11, 12), in which method digital messages (40) which contain information on the desired reply address (32) are mass sent (3), and messages, which are sent on the basis of the reply-address information (32) are received (10). According to the invention, the reply-address information of each mass-sent message (40) is converted (3) to correspond to a predefined dialogue, in which the stage of the dialogue defines unequivocally the reply-address information (32), so that the transmission and reception of the messages are implemented in different parts of the telecommunications system (1, 2, 6, 11, 12).

12 Claims, 3 Drawing Sheets
(3 of 3 Drawing Sheet(s) Filed in Color)

OTHER PUBLICATIONS

Finnair Plc's press release Sep. 6, 2004, "Finnair to introduce the world's easiest check-in—with a text message", www.bookit.net/news/.

Verkkouutiset Feb. 21, 2001, "Sonera tarjoaa matkaviestinoperaattoreille Content Gateway-palvelualustaa", www.verkkouutiset.fi.

Content Gateway, Version 4.0, Deployment and Billng Manual, Version 1.0, Jan. 1, 2005, TeliaSonera Finland Oy, www.sonera.fi/files/sonera.fi/.

METHOD AND SYSTEM FOR THE MASS SENDING OF MESSAGES

The present invention relates to a method, according to the preamble of claim 1, for the mass sending of messages.

The invention also relates to a system, according to claim 7.

Methods and systems of this kind are used, for example, for implementing text-message-based booking services.

According to the prior art, e-mail-message mass sending is implemented from a number inside the operators' networks, using Content Gateway technology. The transmission address of the Content Gateway mass-sending technology is not a telephone number familiar from the network side, which takes the form +358 400 123 456, but is instead a short service number, which is not a proper telephone number but, for example, 16400. Because it is not an actual network number, it cannot roam from one network to another, but instead goes directly to the content gateway of the operator in question. In this document, the term roaming refers to the updating of number information, either when the terminal device moves from one country to another, or to the functionality of the service number when using a service from a different country to that in which the service provider is situated. Operators have constructed many different and complex solutions, which have been used to make services operate also in other operators' networks and number spaces. In practice, this leads to complicated mutual agreements concerning the common use of specific numbers, for example, in such a way that messages coming to a specific number of another operator are routed back to the operator owning the number.

For years, attempts have been made to harmonize numbers within Europe, but competing operators have never reached an agreement on common service numbers. An additional difficulty in the concrete implementation of the existing technology is that the solution should connect the communications apparatus inside one operator's network with the corresponding communications apparatuses of the operators of other networks (point to point). This fosters a large number of agreements and connections from one place to another. Thus, in practice these solutions only function between a few operators.

According to the prior art, mass-sending systems for messages are thus implemented telephone-operator-specifically, in such a way that the operator's own number, which as described above is not even a real roaming number, appears in the 'sender' field of messages. Thus, the services have not functioned outside the own country. Such a system has not been suitable for demanding query dialogues, because using the 'reply function' messages have always returned to the same number and only if the subscriber has been in his home network.

Attempts have also been made to solve the problem by using tailor-made modem banks, but these solutions have been slow, expensive, and even unreliable.

The invention is intended to eliminate the problems of the prior art disclosed above and for this purpose create an entirely new type of method and system for the mass sending of messages and preferably to provide a service for international use.

The invention is based on changing the desired reply address of each mass-sent message, typically the sender information, to correspond to a predefined dialogue, in which a stage of the dialogue defines unequivocally the sender information, so that the sending and reception of messages are implemented in different parts of the telecommunications network.

More specifically, the method according to the invention is characterized by what is stated in the characterizing portion of claim 1.

The system according to the invention is, in turn, characterized by what is stated in the characterizing portion of claim 7.

Considerable advantages are gained with the aid of the invention.

The solution is operator-independent and will operate in the networks of all operators. The most typical applications of the invention will operate in any GSM customer telephone whatever, in any network whatever. The invention offers a cost advantage on the sending side, due to mass sending, and nevertheless the reception operates completely country-independently, i.e. in a fully roaming form in the network of each operator.

In the following, the invention is examined with the aid of examples and with reference to the accompanying drawings.

The patent or application file contains at least one drawing executed in color. Copies of this patent or patent application publication with color drawing(s) will be provided by the office upon request and payment of the necessary fee.

Figure 1:
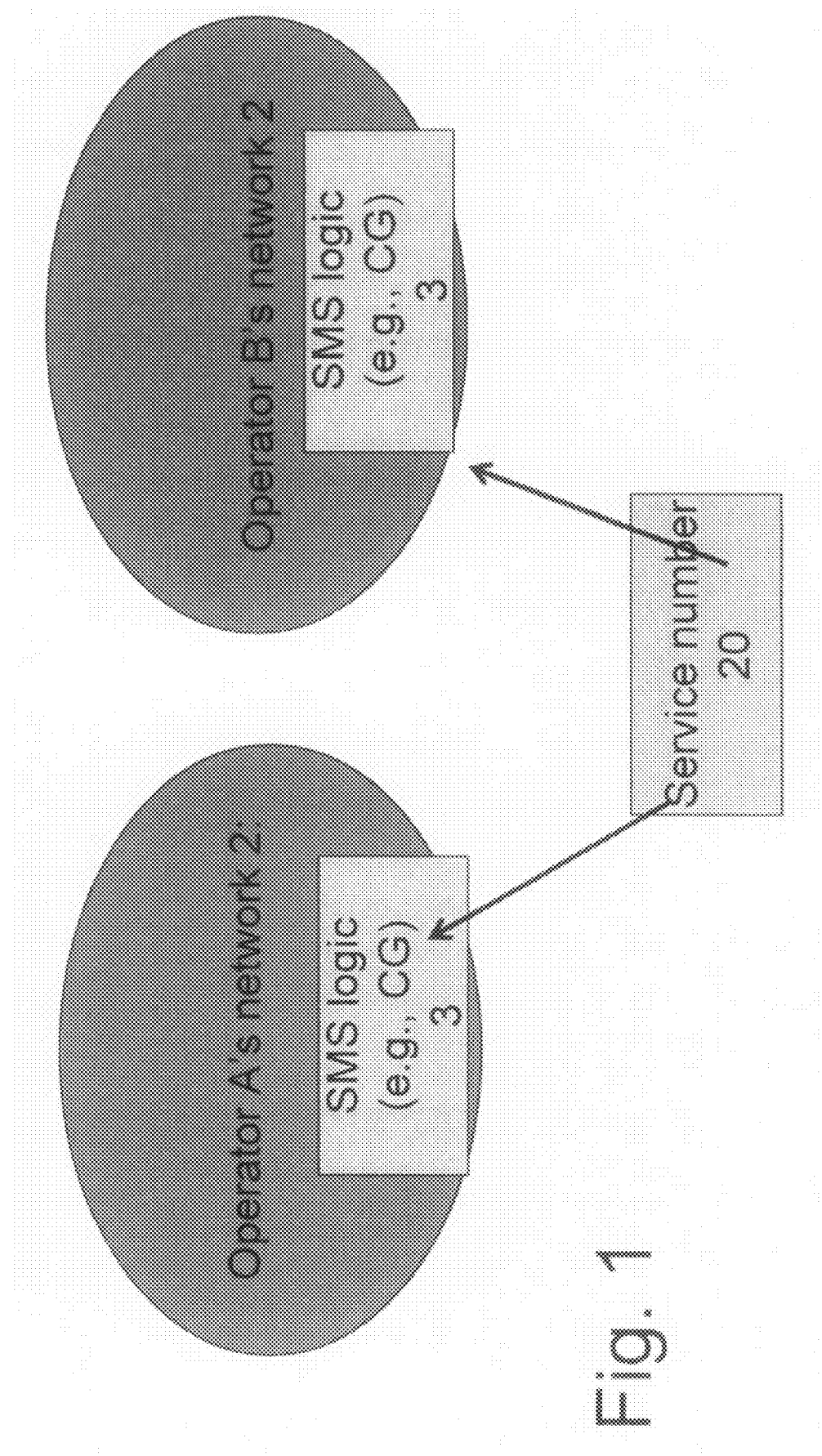
FIG. 1 shows schematically a solution according to the prior art.

According to FIG. 1, in the prior art, telephone operators A and B have text-message mass-sending means 3 in their own networks, which allow each operator to send large numbers of text messages efficiently. In the solution shown, each operator has a service number 20, which relates to a common message service arranged by agreement and by connection technology, and which is not available to other operators who are not party to the agreement. According to the prior art, the service number 20 is a non-roaming short number.

Figure 2:
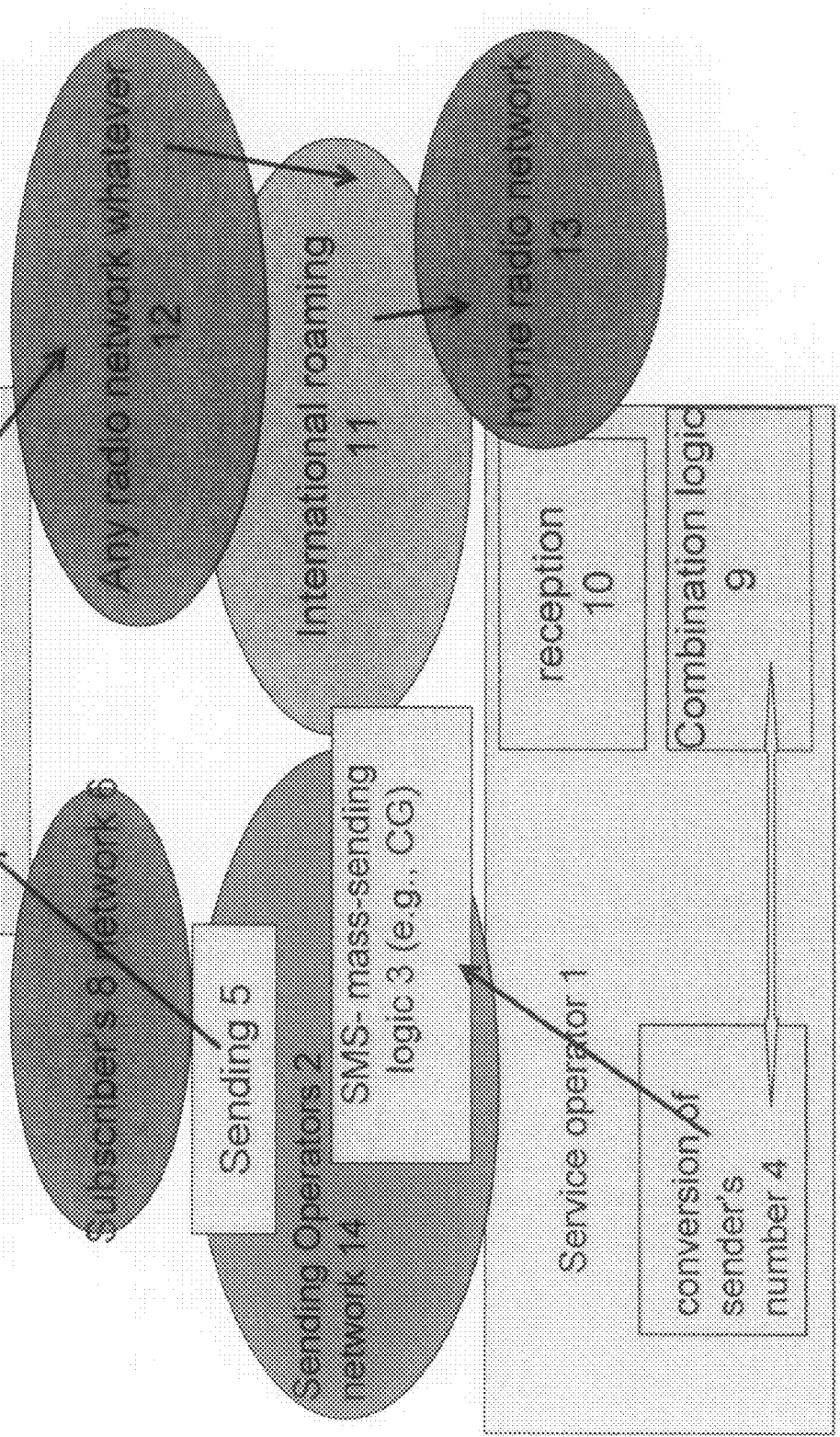
FIG. 2 shows a block diagram of one solution according to the figure.

According to FIG. 2, in the system there are typically two parties who, in exceptional cases, can be the same company.

The service is provided by a service company or association 1, which provides subscribers 8, for example, with booking services for purchasing tickets, changing tyres, etc. The service company or association 1 operates within the radio network of some operator, in a home network 13.

In the present application, the term service company or association 1 refers to a company or association, which operates in either its own or an external telecommunications network, producing services for customers, either directly or indirectly. Typically such a company or association is a subcontractor of an actual telephone operator, and the user of the service need not necessarily even be aware of the existence of the service company or association 1. In a preferred embodiment of the invention, the service company or association produces many different kinds of booking and time reservation services, either directly or indirectly, for telephone subscribers.

The system also includes a telephone operator 2, in whose network 14 there are means and apparatuses for mass sending digital messages (such as SMS messages), containing sender information. Such a practical network element is, for example, SNS mass-sending logic 3, which can be implemented, for example, using Content Gateway technology.

Figure 3:
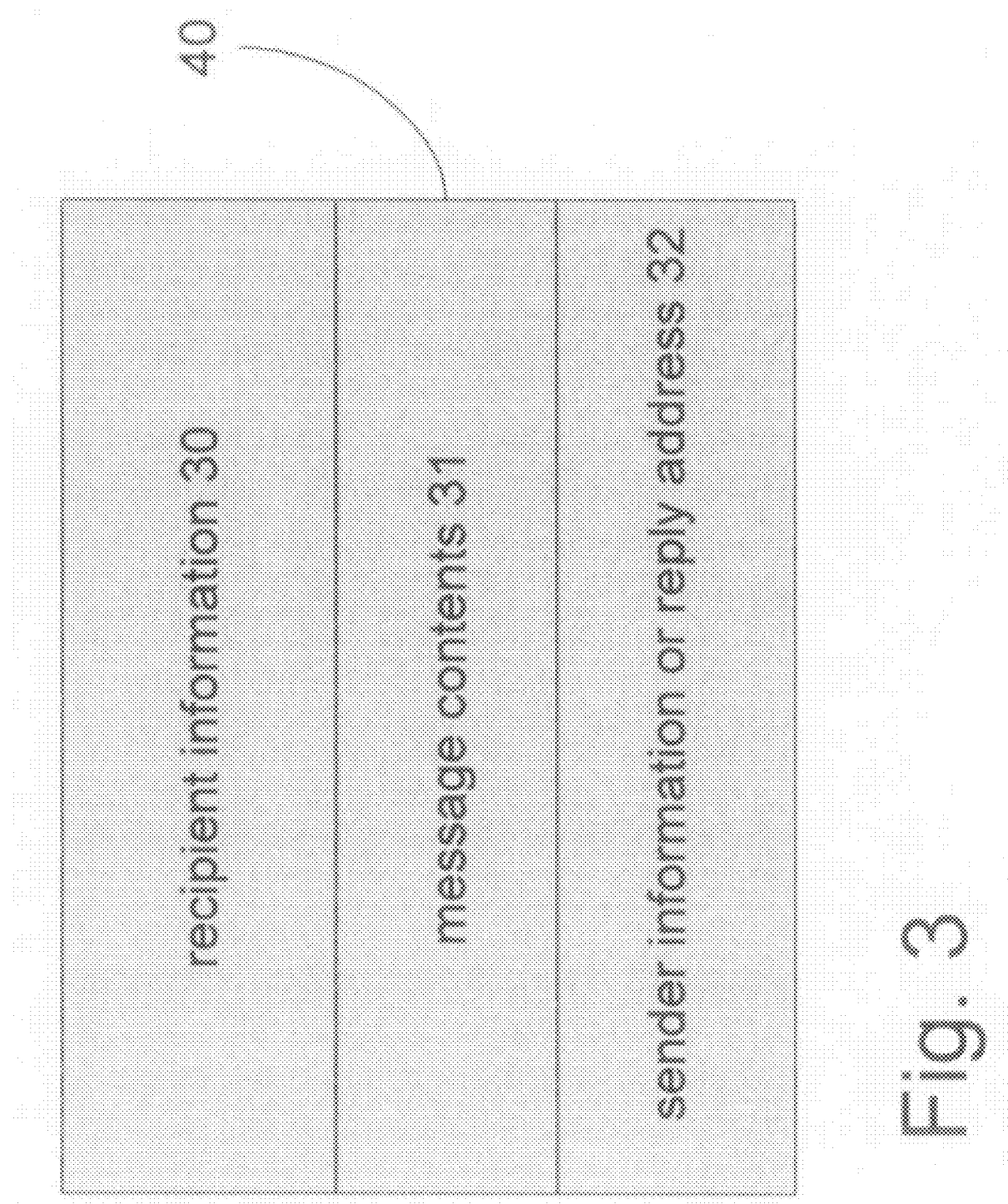
FIG. 3 shows schematically information fields in a message according to the invention.

With reference to FIGS. 2 and 3, in the first stage of the service the service company or association 1 uses combination logic 9 and number conversion 4 to form a large number of messages 40, each of which contains recipient information 30, the actual message content 31, and information 32 on either the sender or, in practice of the address, to which a reply to the message 40 is desired. In an SMS (short-message system) application, the recipient information 30 is a mobile-station telephone number and the sender information 32 is the sender data converted by a number converter 4, in the sender field 32 of the SMS message.

Within the scope of the invention, the message 40 can be any message whatever that can be sent over a digital communications network, and which comprises recipient information, the actual message, and information on the desired reply address, for example, in the form of sender information. Besides SMS messages, such messages 40 can be, for instance e-mail messages, or for example multimedia messages (MMS).

A large number of the aforesaid messages are formed dynamically on the basis of complex dialogues. Correspondingly, for example in emergency applications, the message totality can be static, ready for an emergency situation.

In the conversion of the desired reply address, for example, the sender's number, the address (or number) from which the contact to the service company or association 1 is formed, can be taken into account. This makes it possible to route the messages of US subscribers 8 to their own national server, and correspondingly the messages of Finnish users of the same service to their own national server. From these national servers, the reply messages can be transferred for further measures by the service company or association 1, using suitable telecommunications connections.

The messages formed by the service company or association 1 are sent to the mass-sending logic 3, which is located in the network 14 of the operator 2, from where the mass sending 5 of messages is implemented. From here, the messages (40) are distributed according to the recipient information 30 and arrive at the terminal device 7 of the subscriber 8 through the radio network 6 in which the subscriber 8 is at that moment. The subscriber 8 responds to the message using the 'reply' function, in which case the reply message goes to the address that is determined by the value of the sender or reply-address field 32 of the incoming message. The message 40 goes to the service company or association 1 over radio networks 12, 11, and 13. Naturally, if the subscriber 8 is in the area of the home network 13 of the service company or association, the message will not travel over the networks 11 and 12. From the home network 13, the message is transferred to the message reception 10 of the service company or association 1, where it is combined with a suitable dialogue with the aid of the combination logic 9 and number conversion.

More concretely, for example in an SMS application, when a message is sent to the subscriber 8, the sending number (A number) is converted before mass sending in block 4, for example +358500001, in the first stage of a predefined session (dialogue). The number space of the sender's number (A number) is determined by the service provider's 1 own number space, which in the invention is entirely independent of the sending operator's 2 number space. In the next stage of the same session, the A number is controlled by the logic 9 of the service company or association 1, for example +358500002 and so on. The A number to be sent is determined tightly from a logically proceeding dialogue formed by the service provider 1, in which the reply to each message sent is expected at a specific telephone number (digital reply address), which is included as the A number in the outgoing message.

Thus, the subscriber responds to the SMS message using the reply function, in which case in the first stage of the dialogue the reply goes to the number +35800001 and correspondingly in the second stage of the dialogue to the number +3580002.

Example dialogue:

| Message | Sending number |
|---|---|
| 1. Do you need to change tyres, reply y/n | +35850001 |
| 2. Would 07.12.2005 be a suitable date, reply y/n | +35850002 |

The subscriber's 8 reply 'y' sends the service provider's 1 system the message 2. The dialogue terminates, if the reply to the first message is 'n'. In stage 2, the reply y leads to the time being booked, the reply 'n' leading, on the other hand, to a new booking proposal.

Thus, the messages described above would be sent as mass sendings to hundreds or thousands of recipients at one time, in which case the A number of the first stage of the dialogue (=field 32) would be always +35850001 and correspondingly in the second stage of the dialogue always +35850002, so that the reply to each sent message is always targeted to the correct number. In connection with the reply, the A number of the sender 8 is, on the other hand, determined by the person for whom the booking is made.

According to the invention, a preferred embodiment is an SMS message, but according to the invention the message can be some other kind of digital short message, in which it is possible to reply to the message without separately defining the recipient. Thus, instead of telephone-number data, the sender or reply-address field (field 32 in FIG. 3) can contain the desired reply address in some other form too, for example, as an e-mail address, or as numeric or alphanumeric sender or reply-address information.

The number conversion allows reception of the message to take place typically in an open radio network outside the network of the operator (2) who has sent the message and to be routed on the basis of the A number to the system of the service company or association 1.

Thus, in the SMS embodiment in the invention, before a mass sending, the information in the 'sender' field of the text message being sent is changed, by having a different value to that of the real number of the sender entered in it. This value is obtained from the logic 9, 10 of the service company or association 1, according to a predefined rule, in such a way as to permit combination of the questions and replies arriving at the logic.

In addition, in the system of the service company or association 1, there is logic 9 that connects the sending end and the receiving end, which is able to combine the sent message and the return message arriving from the external operator 2, in such a way that the subscriber can reply (from outside of the network) from any subscription at all, but nevertheless sending can take place from inside the network at a large capacity and economically. In other words, it is possible to select the cheapest sending operator, but reception can take place from any telecommunications network whatever.

According to the invention, at the message reception end, reception can be dispersed, so that, for example, reception in Sweden takes place to a local network element and in Finland correspondingly to a Finnish network element, messages received from which national network elements are transferred over suitable connections, for example IP connections for further processing arranged by the service company or association. Thus the service's international roaming will be faster and cheaper, as well as more reliable. In addition, it will be more pleasant for the consumer to use the service, because sending takes place to the number of a local operator, and not to the network of an external operator, which is assumed to be more expensive. In some subscriptions, foreign text messages are even blocked, i.e., they will not work without the service according to the invention.

One embodiment of the invention is described in the following:

There are thousands of experts, who are needed in various catastrophe and emergency situations, or in other surprising situations, when a sudden need arises to have a large group of competent people to act simultaneously. Often the situation is one in which personnel is needed in several locations simultaneously, in which case messages concerning several subjects will be sent from an emergency control centre. The necessary personnel will then receive a message in their telephone, using the system according to the invention, and each participant will reply to whichever message they regard as most suitable for themselves. Thus, the control centre can decide, on the basis of the replies, who to send and to what area.

For example, after an earthquake the emergency control centre uses the message mass-sending logic to send, to a thousand people specialized in emergency aid, messages that help and expertise are required in Area 1, Area 2, and Area 3. When a person specialized in emergency aid receives these three messages through his own operator, he is able to reply to the message that is the best alternative for him. The reply from the expert is sent over the radio network to the number defined by the message as an individual message via the service company or association 1 to the emergency control centre. When the message is received, the service provider's (1) server is able to combine the information on which experts are going to each of the Areas 1-3. Thus the emergency control centre can immediately act and rapidly forward the necessary personnel and equipment to the location in question.

One application according to the invention is also the creation of a link to a person who travels globally in the service of an international major corporation. Large corporations typically have their own message communications centres, responding to the messages sent by which is difficult using existing technology, because if, for example, an American receives a group message from his company when he is in India, the 'reply' function cannot be used to reply to the message, because using existing technology there is a non-international number in the sender field. According to the invention, both international roaming and also the further processing of the reply to the message are solved.

If, according to what is stated above, a person who is a subscriber wishes to reply only to telephone numbers with the code of his own country, the service provider can send from his own country group messages as a mass sending, in which the number of the sender is converted to an internal number of the recipient's country and the recipients can reply in their own area, without international numbers. In that case, the service provider will require servers in the country in question. Reply messages from the country-specific server are transmitted, for instance, over an IP connection to a server in the service provider's country, in which there is combination logic.

In the invention, a number external to the network is thus converted into the sender's identifier (=the desired reply address), so that it must return through the radio interface of the network. Thus, in the reply situation the message is not routed directly to a service number inside the network, but instead through a radio interface outside the network, so that it roams automatically. For this operation, in one preferred embodiment of the invention there is, thus, not the short number 16400, but instead the fully roaming international number +358 5016400.

According to the invention, for example, a thousand messages are sent at one time using a mass-messaging application 3, in such a way that each individual message is given converted sender information for the reply message, so that the return messages arrive at different times (as people gradually reply) through several radio modems, so that the momentary capacity required for each radio modem will be small. However, with the aid of the invention, the functioning of services outside the service provider's home country, i.e. roaming operation, is achieved.

In this application, the term sender information refers to both a telephone number (A number) and to any information whatever, transported with a message, concerning the desired return address.

The method and system according to the invention are implemented, with the aid of at least one computer, in a telecommunications network.

The preferred application environment of the solution according to the invention is disclosed in publication WO 2004/019223, Booking System, messages sent by the system applied to which can be implemented using the mass-sending method according to the present invention.

The invention claimed is:

1. Method for sending messages in a telecommunications network (1, 2, 6, 11, 12), in which method
   digital messages (40) which contain information on the desired reply address (32) are mass sent (3), and
   messages, which are sent on the basis of the reply-address information (32) are received (10),
characterized in that
   the reply-address information of each mass-sent message (40) is converted (3) to correspond to a predefined dialogue, in which the stage of the dialogue defines unequivocally the reply-address information (32), so that the transmission and reception of the messages are implemented in different parts of the telecommunications system (1, 2, 6, 11, 12).

2. Method according to claim 1, characterized in that the desired reply-address information is the sender field (32) of the message (40).

3. Method according to claim 1, characterized in that the message (40) is an SMS message.

4. Method according to claim 1, characterized in that the message (40) is an MMS message.

5. Method according to claim 1, characterized in that the message (40) is an e-mail message.

6. Method according to claim 1, characterized in that the reply-address information (32) of the message (40) is converted into a national address operating in the recipient's (8) own country, such as a national telephone number.

7. System for sending messages in a telecommunications network (1, 2, 6, 11, 12), which system comprises
   means for mass-sending digital messages (40), which contain information on the desired reply address (32), and
   means for receiving messages (40), which are sent on the basis of the reply-address information (32),
characterized in that, the system comprises
   means for converting the reply-address information (32) of each mass-sent message (40) to correspond to a predefined dialogue, in which the stage of the dialogue defines unequivocally the reply-address information (32), so that the transmission and reception of the messages (40) are implemented in different parts of the telecommunications system (1, 2, 6, 11, 12).

8. System according to claim 7, characterized in that the desired reply-address information is the sender field (32) of the message (40).

9. System according to claim 7, characterized in that the message (40) is an SMS message.

10. System according to claim 7, characterized in that the message (40) is an MMS message.

11. System according to claim 7, characterized in that the message (40) is an e-mail message.

12. System according to claim 7, characterized in that it comprises means for converting the reply-address information (32) of the message (40) into a national address operating in the recipient's (8) own country, such as a national telephone number.

* * * * *